United States Patent
Riggs et al.

(10) Patent No.: US 6,540,498 B1
(45) Date of Patent: Apr. 1, 2003

(54) APPARATUS FOR THERMOSETTING THERMOPLASTIC TUBES

(75) Inventors: Richard H. Riggs, Saline, MI (US); David John Gabbey, Pinckney, MI (US); Patrick L. Marion, Adrian, MI (US)

(73) Assignee: Pilot Industries, Inc., Dexter, MI (US)

( * ) Notice: Subject to any disclaimer, the term of this patent is extended or adjusted under 35 U.S.C. 154(b) by 13 days.

(21) Appl. No.: 09/970,606

(22) Filed: Oct. 4, 2001

(51) Int. Cl.$^7$ ............................................. B29C 53/08
(52) U.S. Cl. .................... 425/174.4; 264/327; 264/339; 425/384; 425/392
(58) Field of Search ........................... 425/174.4, 384, 425/392, 403; 264/327, 339, 521

(56) References Cited

U.S. PATENT DOCUMENTS

| | | | |
|---|---|---|---|
| 3,184,796 A | * 5/1965 | Southcott et al. | 425/392 |
| 3,884,612 A | * 5/1975 | Parmann | 425/392 |
| 5,200,124 A | 4/1993 | Bowkett | 264/25 |

* cited by examiner

Primary Examiner—James P. Mackey
(74) Attorney, Agent, or Firm—Gifford, Krass, Groh, Sprinkle, Anderson & Citkowski, P.C.

(57) ABSTRACT

An apparatus is disclosed for thermosetting thermoplastic tubes in a predefined shape having at least one bend. The apparatus includes an oven with an interior chamber which is heated to a temperature approaching that at which the tube thermally deforms. An elongated former has a channel dimensioned to receive the tube, and this channel has the predefined shape. A thermally absorbent coating is disposed only on a surface of the former adjacent to and extending across each bend of the former. This thermally absorbent coating locally adds the thermal energy required to reset the memory of the tube at the bend location. A conveyor extends through the oven chamber from an inlet end and to an outlet end of the oven, and the former is attached to the conveyor.

9 Claims, 1 Drawing Sheet

APPARATUS FOR THERMOSETTING THERMOPLASTIC TUBES

BACKGROUND OF THE INVENTION

I. Field of the Invention

The present invention relates to an apparatus for thermosetting thermoplastic tubes in predefined shapes.

II. Description of the Prior Art

Tubes of a thermoplastic material are used in a wide variety of applications, e.g. the automotive industry. In the automotive industry, such thermoplastic tubes are used as fuel conduits for vapor, fuel, hydraulic, cooling and/or oil. In such applications, the tube is oftentimes required to be in a specific shape or configuration prior to its installation in the automotive vehicle.

Previously, in order to form the thermoplastic tube into a specific shape, the thermoplastic tube was inserted into or onto a former which bent the tube into the desired shape. After the tube was inserted into the former and held in the desired shape, it was necessary to heat the thermoplastic material to a temperature at which the thermoplastic material thermally deforms. Following such deformation, the thermoplastic tubes as well as the formers were cooled which causes the thermoplastic to thermally set into the shape defined by the former. Consequently, upon removal of the thermoplastic tube from the former, the thermoplastic tube would retain the shape defined by the former.

There have been several different methods for heating the former with the attached thermoplastic tube. In one previously known method, the formers with the attached thermoplastic tube were inserted into a vat of liquid, typically glycol, which was heated to a temperature at which the thermoplastic material thermally deforms. After immersing the former with the attached thermoplastic tube into the vat for a predetermined period of time, typically several minutes, the former was removed and both the former and thermoplastic tube cooled. This previously known method of heating the thermoplastic tubes, however, had several disadvantages. A primary disadvantage of utilizing a vat of heated liquid is that the overall operation was necessarily messy since liquid from the vat would drip on the workplace around the vat. This, in turn, required that the work area around the vat be continually maintained to ensure safety.

A further disadvantage of this previously known method of heating the formers with the thermoplastic tubing is that it is necessary to periodically dispose of the liquid in the vat. This, in turn, can result in an undesirable environmental impact where materials, such as glycol, are used in the vat.

There have, however, been previously known devices for heating formers with their attached thermoplastic tubes in which the formers were conveyed through a heated oven such as the device disclosed in U.S. Pat. No. 5,200,124 to Bowkett. In this previously known apparatus, a conveyor extended through an oven chamber and the formers were attached to the conveyor so that the conveyor conveyed the formers with their attached thermoplastic tubes through the oven. The oven in turn was heated by radiant heaters in order to heat the thermoplastic tube to a point of thermal deformation. This previously known apparatus, however, has not proven wholly satisfactory in use.

One disadvantage of this previously known apparatus was that the radiant heaters were arranged in the oven so that the radiant heaters concentrated the heat output from the heaters only at the areas of the former at which a bend was desired. This, however, required that the arrangement of the radiant heaters be altered whenever a former with a different shape was conveyed through the oven. Furthermore, this previously known device was inappropriate when formers of different shapes were simultaneously conveyed through the oven.

There have, however, been previously known ovens in which the entire oven chamber was heated to a temperature at which the thermoplastic tube thermally deformed. Radiant heating is typically utilized to heat the interior of the oven. These previously known devices, however, have also not proven wholly satisfactory in use.

A primary disadvantage of these previously known devices is that the entire thermoplastic tube was subject to radiant deformation including not only the bend areas of the former, but also the straight sections of the thermoplastic tube between the bends. The thermal deformation of the straight sections of the thermoplastic tube, however, may actually result in undesirable collapse of the thermoplastic tube. While internal inserts into the thermoplastic tube may be utilized to minimize collapse of the thermoplastic tube due to thermal deformation, the use of such inserts are time consuming, labor intensive and therefore undesirably expensive.

SUMMARY OF THE PRESENT INVENTION

The present invention provides an apparatus for thermosetting thermoplastic tubing which overcomes all of the above-mentioned disadvantages of the previously known devices.

In brief, the apparatus of the present invention comprises an oven having an interior chamber. A conveyor extends through the oven chamber from an inlet end of the oven and to an outlet end of the oven.

The interior of the oven is heated to a temperature approaching that at which the thermoplastic tubing deforms. Preferably, radiant heaters arranged in banks along the interior walls of the oven are utilized to heat the oven chamber.

An elongated former includes a channel dimensioned to receive the thermoplastic tube. Furthermore, this channel has the predefined shape of the desired thermoplastic tube and, as such, includes at least one bend. The thermoplastic tube, furthermore, is sufficiently flexible so that the tube may be inserted into the former channel and thus into the desired final shape for the thermoplastic tube.

Unlike the previously known formers, however, a radiant heat absorbent coating is disposed on the outer surface of the former adjacent to and extending across each bend on the former. This absorbent coating preferably comprises a black coating on the former, such as black paint.

In practice, as the formers with their attached thermoplastic tube are conveyed through the oven interior, the absorbent coating on the former locally increases the heat absorption and heat energy of the tube in the area around the bends of the former in an amount sufficient to reset the elastic memory of the tube at the bend location. In doing so, the absorbent coating relatively quickly heats the bent portions of the thermoplastic tube to a point of thermal deformation. Conversely, the straight sections of the former, i.e. the sections where a bend of the thermoplastic tube is undesired, heat less quickly and also remain at a cooler temperature thus minimizing thermal deformation of the straight sections of the thermoplastic tube and likewise minimizing possible collapse of the thermoplastic tube due to thermal deformation.

After the formers with their attached thermoplastic tubes are conveyed through the oven chamber, the formers and tubes are then cooled in any conventional fashion. After cooling, upon removal of the thermoplastic tube from the former, the thermoplastic tube has thermally set and thus retains the shape of the former.

BRIEF DESCRIPTION OF THE DRAWING

A better understanding of the present invention will be had upon reference to the following detailed description, when read in conjunction with the accompanying drawing, wherein like reference characters refer to like parts throughout the several views, and in which.

DETAILED DESCRIPTION OF A PREFERRED EMBODIMENT OF THE PRESENT INVENTION

Figure 2:
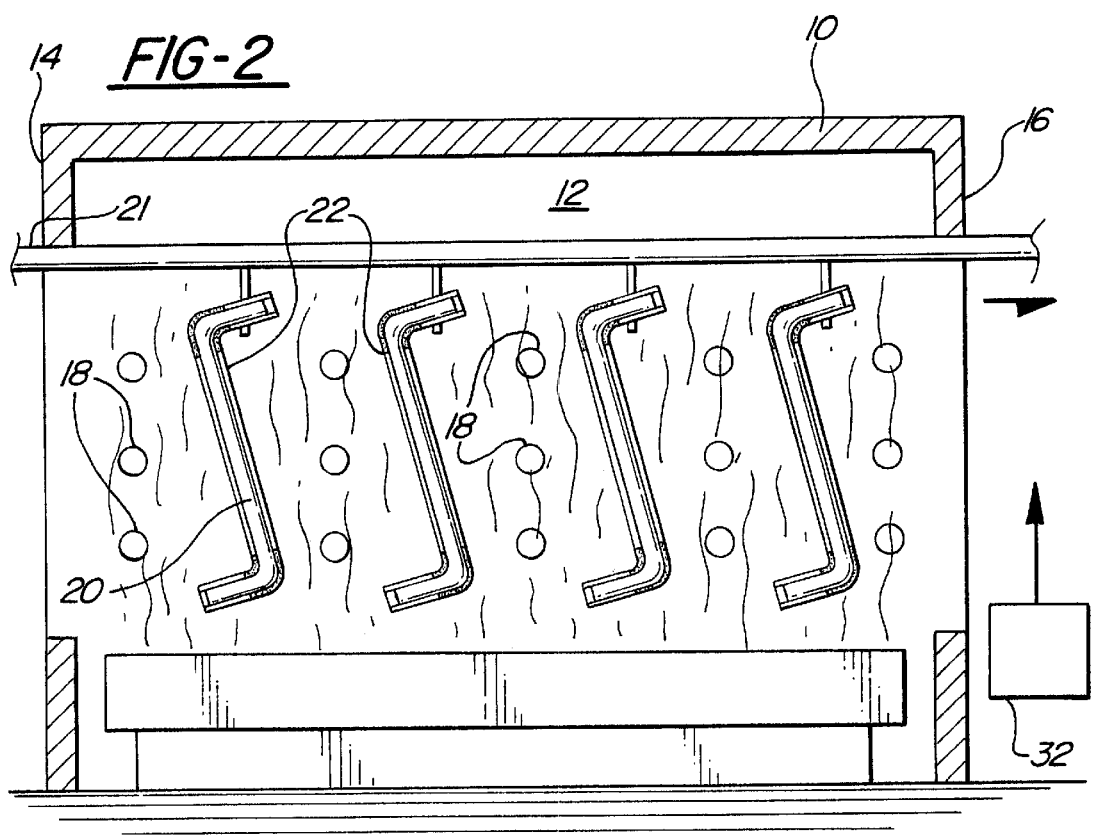
FIG. 2 is a side diagrammatic view illustrating the preferred embodiment of the present invention.

With reference first to FIG. 2, a preferred embodiment of the present invention is there shown and comprises an oven 10 defining an interior oven chamber 12. The oven chamber 12, furthermore, includes an inlet end 14 and an outlet end 16.

Any conventional means is utilized to heat the interior chamber 12 of the oven 10. However, as shown in FIG. 2, one or more banks of radiant heaters 18 are provided around the outer periphery of the oven chamber 12. These radiant heaters 18, furthermore, are sufficient to heat the oven chamber 12 to a temperature approaching that at which a thermoplastic tube 20 thermally deforms.

Still referring to FIG. 2, a conveyor 21, illustrated only diagrammatically, extends from the inlet end 14 and to the outlet end 16 of the oven chamber 12. One or more formers 22 are detachably secured to the conveyor 21 so that, upon actuation, the conveyor 21 conveys the formers 22 through the oven chamber 12.

Figure 1:
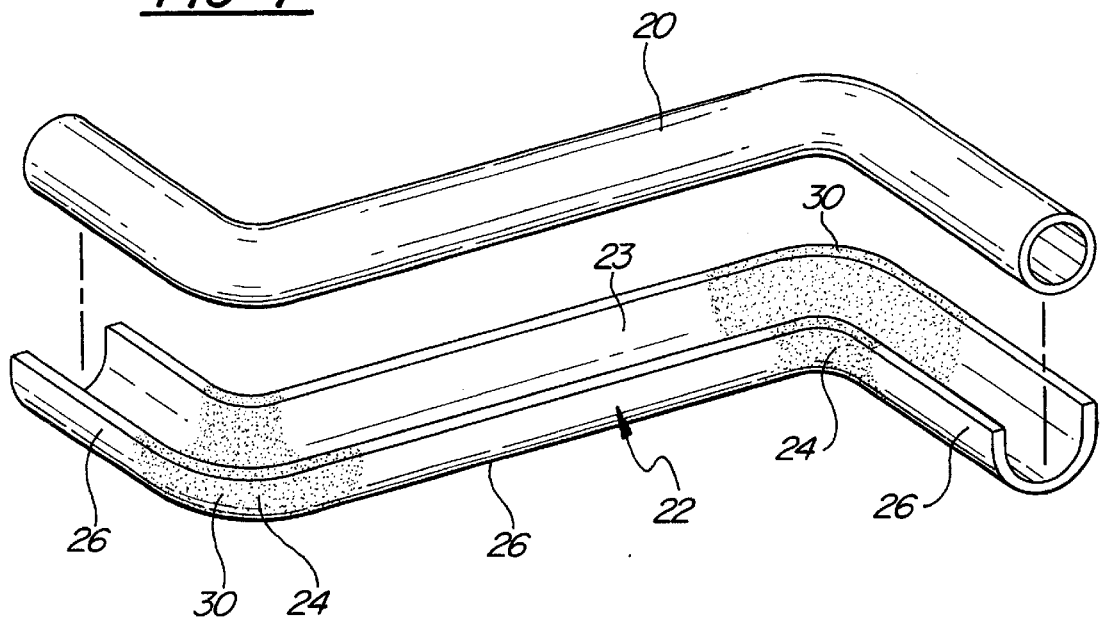
FIG. 1 is an exploded perspective view illustrating a former in accordance with the present invention.

With reference now to FIG. 1, one former 22 is there shown in greater detail. The former 22 is generally U-shaped in cross section and has a predefined shape corresponding to the desired final shape of the thermoplastic tube 20. As such, the former 22 includes at least one bend 24 (two bends 24 are illustrated in FIG. 1) as well as one or more straight sections 26.

The former channel 23 is dimensioned to receive the thermoplastic tube 20 within the channel 23. The thermoplastic tube 20, furthermore, is sufficiently flexible so that the tube 20 can be bend into and retained by the channel 23.

The former 22 can be constructed of any conventional material, such as metal or hard plastic which may be transparent, or the former may be constructed of metal and thermally insulating material. In either case, however, the former 22 retains its rigid shape even when heated within the oven chamber 12.

Unlike the previously known formers, the former 22 includes a radiant heat absorbent coating 30 on its surface only adjacent to and extending across each bend 24. Preferably, the coating 30 is provided on the outer surface of the former 22 and preferably comprises a black paint or other black material.

In operation, the thermoplastic tube is bent into the former channel 23 as shown in FIG. 1 so that the thermoplastic tube 20 assumes the shape of the former channel 23. The former 22 is then secured to the conveyor 21 so that the former 22 with its attached thermoplastic tube 20 is conveyed through the oven chamber 12. Inserts may be required for very tight bends.

As the former 22 is conveyed through the oven chamber 12, the radiant heat absorbent material 30 on the tube increases the radiant heat absorption of the tube 20 from the radiant heaters 18 and creates localized increased heating around the bends 24 of the former 22 so that the tube is locally heated by an amount sufficient to reset the elastic memory of the tube 20 in the bend area. Since the heating of the former 24, and thus the heating of the thermoplastic tube 20, is localized at only the bend portions of the former 22, the thermoplastic tube 20 softens as desired at its bend portions without thermal deformation and/or thermal collapse of the straight sections of the tube 20. Preferably, the formers 22 are conveyed through the oven chamber 12 at a speed sufficient so that the straight sections 26 of the tube 20 do not reach a point of significant thermal deformation.

After the formers 22 with their attached thermoplastic tube 20 exit from the outlet end 16 of the oven chamber 12, any conventional means 32 (illustrated only diagrammatically) are used to cool the formers 22 and the tubes 20. Upon removal of the tubes 20 from their associated formers 22, the tubes 20 are thermally set in the shape defined by the former 22 in the desired fashion.

From the foregoing, it can be seen that the present invention provides a simple and yet highly effective apparatus for bending thermoplastic tubes in predefined shapes. Having described my invention, however, many modifications thereto will become apparent to those skilled in the art to which it pertains without deviation from the spirit of the invention as defined by the scope of the appended claims.

We claim:

1. Apparatus for thermosetting a flexible thermoplastic tubing in a predefined shape having at least one bend comprising:
    an oven having an interior chamber,
    at least one heat source which heats said interior of said oven chamber to a temperature approaching that at which the tubing thermally deforms,
    an elongated former having a channel dimensioned to receive the flexible tubing, said channel having said predefined shape with said at least one bend,
    a radiant heat source to enable local heating of the former,
    a radiant heat absorbent coating disposed only on a surface of said former adjacent to and extending across said at least one bend on said former, and
    a conveyor extending through said oven chamber from an inlet end of said oven and to an outlet end of said oven, said former being temporarily or permanently attached to said conveyor.

2. The invention as defined in claim 1 wherein said former is constructed of metal.

3. The invention as defined in claim 1 wherein said absorbent coating comprises a black coating.

4. The invention as defined in claim 1 wherein said absorbent coating comprises a black paint.

5. The invention as defined in claim 1 wherein said former is constructed of a transparent material.

6. The invention as defined in claim 1 wherein said former is generally U-shaped in cross section.

7. The invention as defined in claim 1 wherein said absorbent coating is provided on an outer surface of said former.

8. The invention as defined in claim 1 and comprising means for cooling said formers at said outlet end of said oven.

9. The invention as defined in claim 1 wherein said former is constructed of metal and thermally insulating material.

* * * * *